(12) United States Patent
Senohrabek et al.

(10) Patent No.: US 8,984,322 B2
(45) Date of Patent: *Mar. 17, 2015

(54) DEVICE CONFIGURED TO SWITCH A CLOCK SPEED FOR MULTIPLE LINKS RUNNING AT DIFFERENT CLOCK SPEEDS AND METHOD FOR SWITCHING THE CLOCK SPEED

(75) Inventors: Kevin D. Senohrabek, Toronto (CA); Natale Barbiero, Toronto (CA); Gordon F. Caruk, Brampton (CA)

(73) Assignee: ATI Technologies ULC, Markham, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/461,041

(22) Filed: May 1, 2012

(65) Prior Publication Data

US 2012/0221883 A1  Aug. 30, 2012

Related U.S. Application Data

(63) Continuation of application No. 12/635,942, filed on Dec. 11, 2009, now Pat. No. 8,190,944.

(51) Int. Cl.
```
G06F 1/08    (2006.01)
G06F 13/40   (2006.01)
G06F 1/06    (2006.01)
G06F 1/10    (2006.01)
G06F 1/12    (2006.01)
```
(52) U.S. Cl.
CPC .............. *G06F 13/4022* (2013.01); *G06F 1/06* (2013.01); *G06F 1/10* (2013.01); *G06F 1/12* (2013.01); *G06F 2213/0026* (2013.01)

USPC .......... 713/501; 713/500; 713/502; 713/503; 713/400; 713/401; 713/600; 713/601

(58) Field of Classification Search
USPC .................. 713/400–401, 500–503, 600–601
See application file for complete search history.

(56) References Cited

U.S. PATENT DOCUMENTS

| | | | |
|---|---|---|---|
| 5,987,540 A | 11/1999 | Hashiguchi | |
| 6,078,202 A | 6/2000 | Tomatsuri et al. | |
| 6,515,530 B1 * | 2/2003 | Boerstler et al. | 327/291 |
| 7,308,523 B1 | 12/2007 | Ngai | |
| 7,401,243 B2 | 7/2008 | Knepper et al. | |
| 7,639,561 B2 * | 12/2009 | Lee et al. | 365/233.11 |

(Continued)

FOREIGN PATENT DOCUMENTS

| | | | |
|---|---|---|---|
| JP | H10232853 A | 9/1998 | |
| JP | H11312027 A | 11/1999 | |
| JP | 2000181566 A | 6/2000 | |

*Primary Examiner* — M Elamin
(74) *Attorney, Agent, or Firm* — Volpe and Koenig, P.C.

(57) ABSTRACT

A device configured to switch a clock speed for multiple links running at different clock speeds and a method for switching the clock signals are disclosed. A frequency divider derives a plurality of clock signals at different frequencies from a source clock signal. A clock switching controller selects a maximum data rate among data rates requested by a plurality of ports of links and outputs a transmit clock signal at the selected maximum data rate to the ports along with a clock enabling signal for each of the ports. Each of the clock enabling signals selectively enables the transmit clock signal for matching a data rate requested by each port. The clock speed may be selected and updated as required by the ports glitch-free in a known amount of time without interrupting data transfers on any of the other ports.

18 Claims, 5 Drawing Sheets

(56) References Cited

U.S. PATENT DOCUMENTS

| | | | |
|---|---|---|---|
| 7,999,581 B1* | 8/2011 | Rozen et al. | 327/115 |
| 8,190,944 B2* | 5/2012 | Senohrabek et al. | 713/500 |
| 2004/0218634 A1* | 11/2004 | Peng et al. | 370/503 |
| 2005/0276269 A1 | 12/2005 | Kim | |
| 2006/0091928 A1* | 5/2006 | Kapur | 327/298 |
| 2006/0203597 A1* | 9/2006 | Izumino | 365/230.05 |
| 2006/0288249 A1 | 12/2006 | Knepper et al. | |
| 2007/0201297 A1* | 8/2007 | Kim | 365/230.05 |
| 2007/0242554 A1* | 10/2007 | Kim | 365/230.05 |
| 2007/0255857 A1 | 11/2007 | Loffink et al. | |
| 2008/0059678 A1 | 3/2008 | Jian | |
| 2009/0052903 A1 | 2/2009 | Mussatt et al. | |
| 2009/0106577 A1* | 4/2009 | Cherpantier et al. | 713/600 |
| 2009/0279889 A1 | 11/2009 | Kirkpatrick et al. | |
| 2010/0064099 A1 | 3/2010 | Nishtala et al. | |

\* cited by examiner

DEVICE CONFIGURED TO SWITCH A CLOCK SPEED FOR MULTIPLE LINKS RUNNING AT DIFFERENT CLOCK SPEEDS AND METHOD FOR SWITCHING THE CLOCK SPEED

CROSS REFERENCE TO RELATED APPLICATIONS

This application is a continuation of U.S. patent application Ser. No. 12/635,942, filed Dec. 11, 2009, now U.S. Pat. No. 8,190,944, which is incorporated by reference as if fully set forth.

FIELD OF INVENTION

This application is related to a computer bus and interconnection protocol, such as Peripheral Component Interconnect Express (PCIe), HyperTransport, or the like.

BACKGROUND

In a computer system, various buses are provided for interconnecting a host processor(s) and other devices and transferring data among them. As an example, PCIe has been developed for replacing the older Peripheral Component Interconnect (PCI) and PCI-X standards. PCIe is used in consumer, server, and industrial applications as a motherboard-level interconnect to link motherboard-mounted peripherals and as an expansion card interface for add-in boards.

A difference between PCIe and earlier PCI or PCI-X buses is a topology based on point-to-point serial links, rather than a shared parallel bus architecture. PCIe can be thought of as a high-speed serial replacement of the older parallel PCI and PCI-X bus. At the software-level, PCIe preserves compatibility with PCI so that a PCIe device can be configured and used in legacy applications and operating systems which have no direct knowledge of the new features of PCIe.

In PCIe 1.0 or 1.1, each lane carries 250 MB/s. PCIe 2.0, released in late 2007, adds a second generation signaling mode, doubling the rate to 500 MB/s. PCIe 3.0, currently in development, will add a third generation signaling mode at 1 GB/s.

PCIe 2.0 and 3.0 also maintain compatibility with the earlier generation of PCIe (i.e., PCIe 1.x). Since PCIe 1.x compatible devices are still being used in the market, PCIe 2.0 or 3.0 compatible devices may need to be connected with PCIe 1.x compatible devices. A PCIe 2.0 or 3.0 device may need to switch clock speeds as required by one of the ports and have the clock speed updated, glitch-free, within a certain period of time without interrupting data transfers on any of the other ports.

SUMMARY

A device configured to switch a clock speed for multiple links running at different clock speeds includes a frequency divider and a clock switching controller. The frequency divider is configured to generate a plurality of clock signals at different frequencies from a source clock signal. The clock switching controller is configured to select a maximum data rate among data rates requested by a plurality of ports of links and output a transmit clock signal at the selected maximum data rate to the ports along with a clock enabling signal for each of the plurality of ports, each of the clock enabling signals selectively enabling the transmit clock signal for matching a data rate requested by each of the plurality of ports.

A method for switching a clock signal for multiple links running at different clock speeds begins by generating a plurality of clock signals at different frequencies from a source clock signal. A maximum data rate among data rates requested by a plurality of ports of links is determined. A transmit clock signal is provided at the selected maximum data rate to each of the plurality of ports. A clock enabling signal is provided to each of the plurality of ports for selectively enabling the transmit clock signal for matching a data rate requested by each of the plurality of ports.

A computer-readable storage medium storing a set of instructions for execution by a general purpose computer to switch a clock signal for multiple links running at different clock speeds. The set of instructions includes a generating code segment for generating a plurality of clock signals at different frequencies from a source clock signal; a determining code segment for determining a maximum data rate among data rates requested by a plurality of ports of links; a first providing code segment for providing a transmit clock signal at the selected maximum data rate to each of the plurality of ports; and a second providing code segment for providing a clock enabling signal to each of the plurality of ports for selectively enabling the transmit clock signal for matching a data rate requested by each of the plurality of ports. The set of instructions may be hardware description language (HDL) instructions used for the manufacture of a device.

BRIEF DESCRIPTION OF THE DRAWINGS

A more detailed understanding may be had from the following description, given by way of example in conjunction with the accompanying drawings wherein.

DETAILED DESCRIPTION

Embodiments described herein allow a device to select one of a plurality of clock speeds as required by one of the ports, and have the clock speed updated, glitch-free, in a known amount of time without interrupting data transfers on any of the other ports. The embodiments provide a solution for clock switching for the device to run multiple links at multiple speeds. The embodiments may be used in any device supporting multiple clock speeds in accordance with any computer bus and interconnection protocol. For example, the embodiments may be implemented in any PCIe compatible devices supporting PCIe 2.0 or 3.0, or any other version that will be developed in the future. Hereafter, the embodiments will be explained with reference to PCIe protocol. However, it should be noted that the embodiments are applicable to any computer bus and interconnection protocols including, but not limited to, PCIe, HyperTransport, etc.

Figure 1:
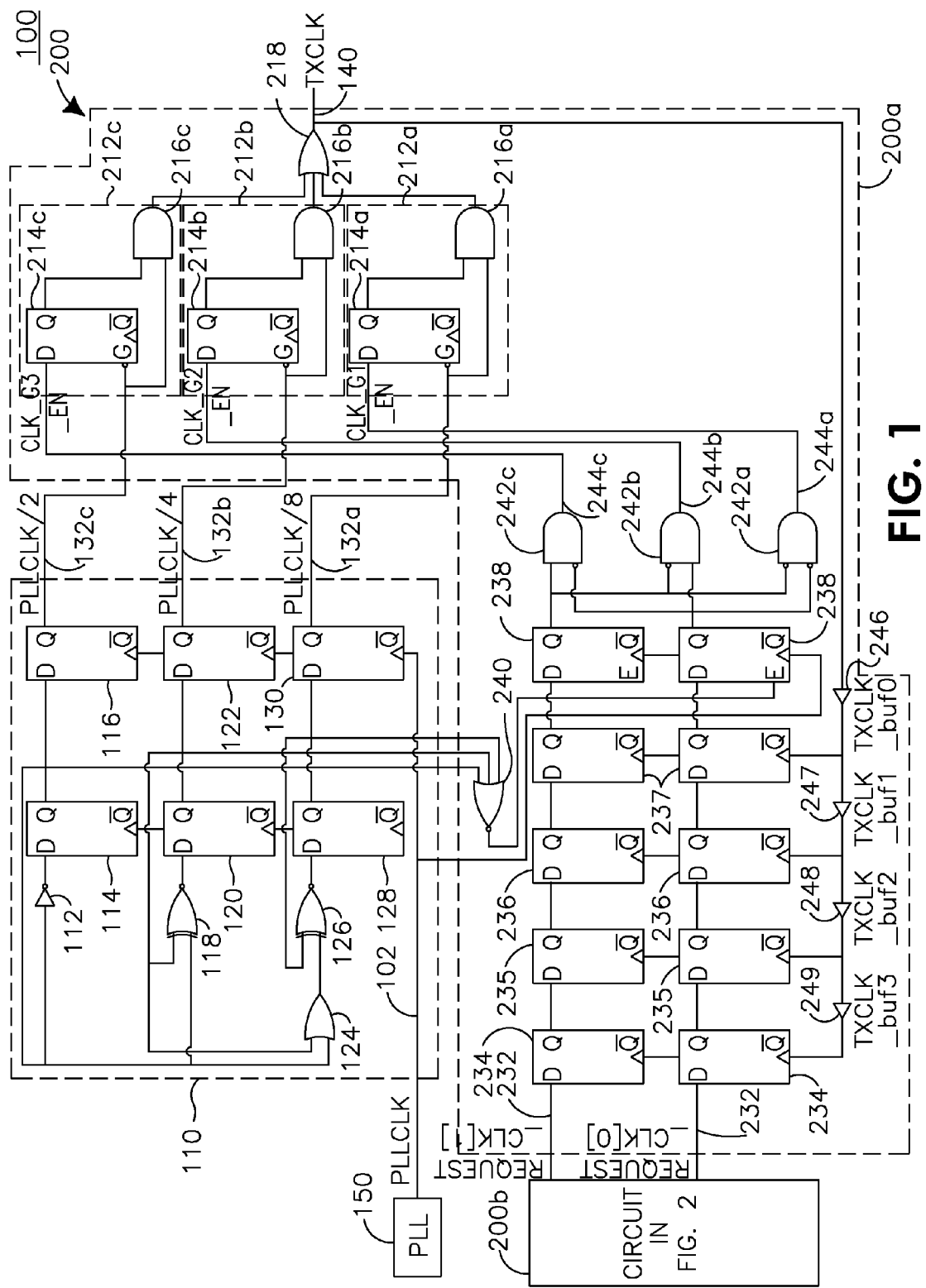
FIG. 1 shows a frequency divider and a first part of a clock switching controller.
Figure 2:
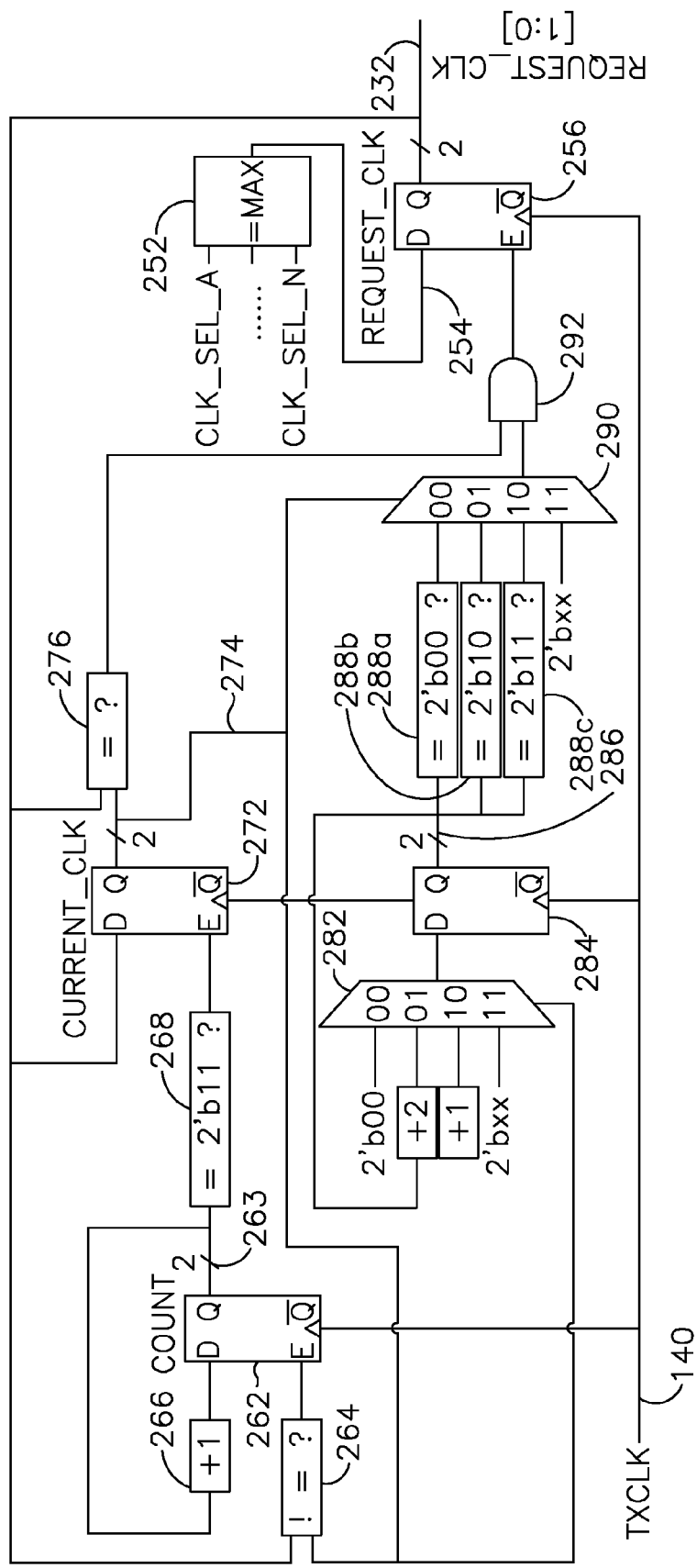
FIG. 2 shows a second part of the clock switching controller.
Figure 3:
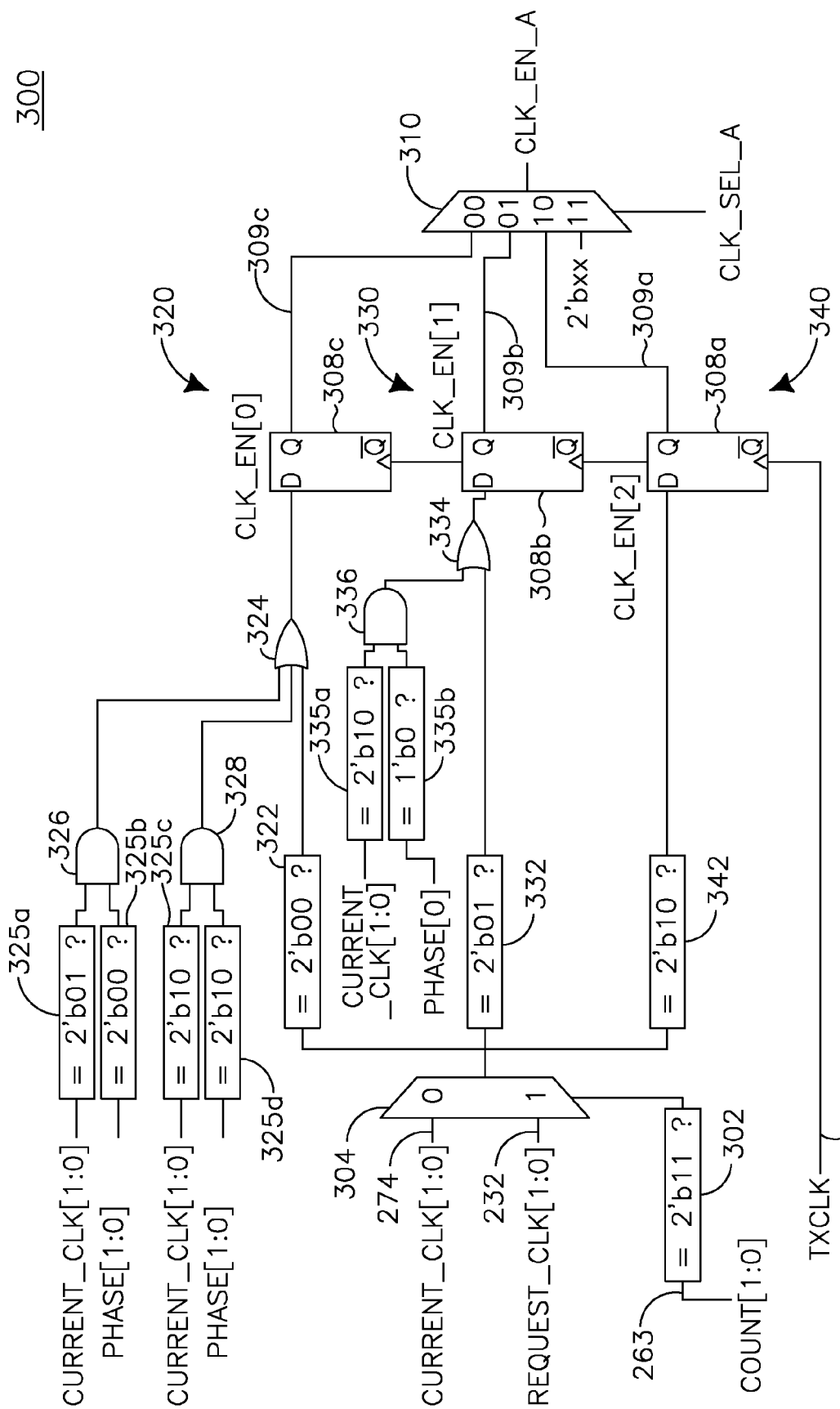
FIG. 3 shows a clock enabling signal generator.
Figure 4:
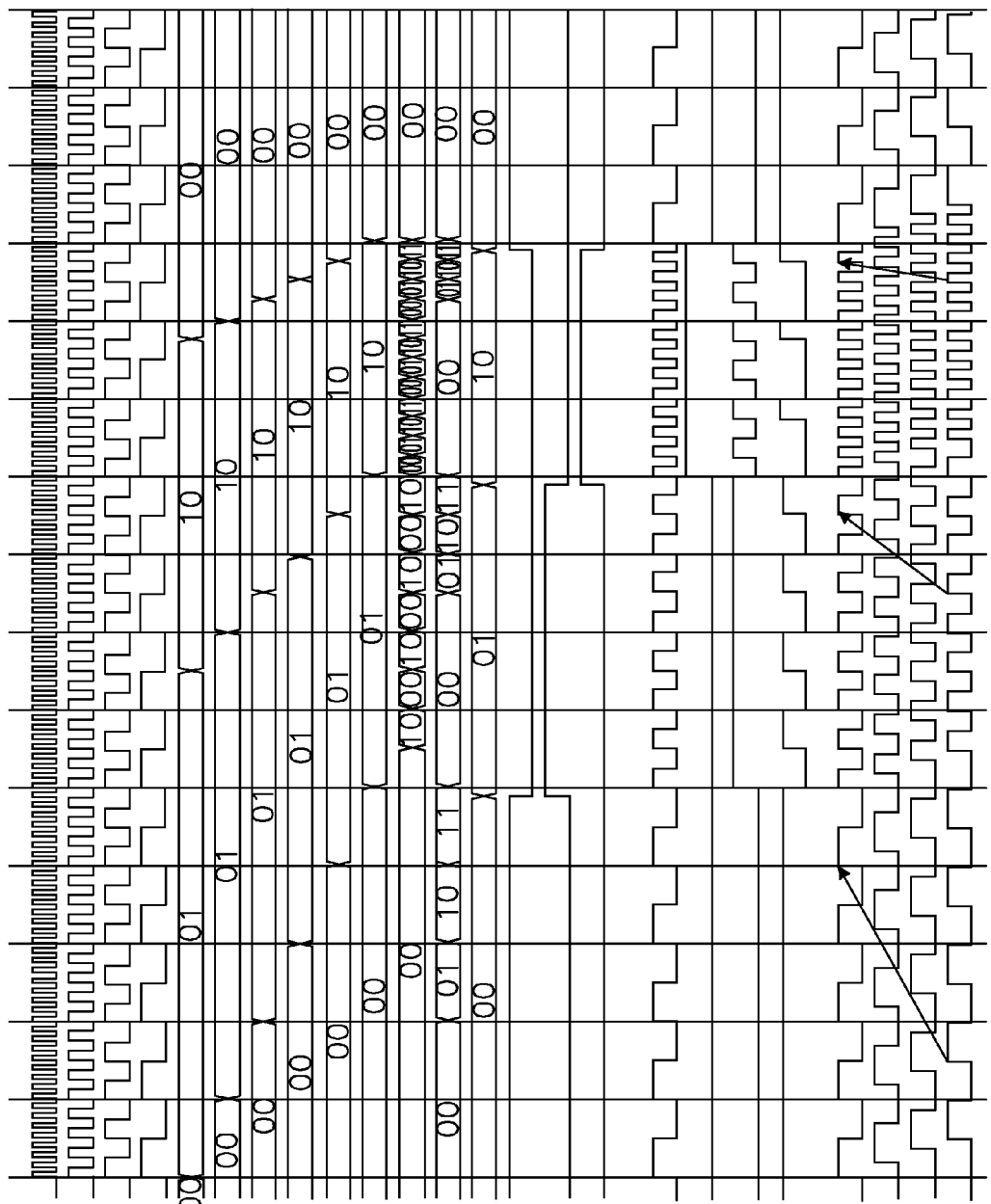
FIG. 4 shows clock switching timing of the clock generator.

FIGS. 1-3 show an example clock generator configured to generate three clock signals in different frequencies and change the speed of the clock in accordance with one embodiment. The clock generator 100 comprises a frequency divider 110 and a clock switching controller 200. FIG. 1 shows the frequency divider 110 and a first part of the clock switching controller 200a. FIG. 2 shows a second part of the clock switching controller 200b. FIG. 3 shows the clock enabling signal generator 300 which is a part of the clock switching controller 200. FIG. 4 shows clock switching timing of the clock generator 100. It should be noted that the clock generator shown in FIGS. 1-3 is an example, not a limitation, and any other configuration for frequency dividing and clock signal switching may be implemented. In addition, the clock generator may generate two or more than three different frequency signals and switch among them as requested.

Referring to FIG. 1, the clock generator 100 receives a phase locked loop (PLL) clock (PLLCLK) signal 102 from a PLL 150. In this example, the frequency of the PLL clock signal 102 is 2 GHz and the PLL clock signal 102 is divided by 2, 4, and 8 by the frequency divider 110 for PCIe third, second, and first generation processing, respectively (the PLL clock signal and three clock signals are shown in lines 1-4 in FIG. 4). It should be noted that the PLL clock signal 102 may be at any frequency and may be divided into any frequency signals as desired by the system. While this example uses a PLL clock signal, one skilled in the art will recognize that other source clock signals may be used.

The example frequency divider 110 in FIG. 1 includes inverter 112, exclusive NOR gates 118, 126, OR gate 124, and D flip-flops 114, 116, 120, 122, 128, 130. D flip-flops 114, 116, 120, 122, 128, 130 are clocked by the PLL clock signal 102. The output of D flip-flop 114 enters D flip-flop 116 and is also fed back to D flip-flop 114 through inverter 112. The output of D flip-flop 114 is inverted every PLL clock cycle and therefore D flip-flop 116 outputs a PCIe third generation clock signal 132c at half the frequency of the PLL clock signal (i.e., generates a PCIe third generation clock signal).

The output of D flip-flop 120 enters D flip-flop 122 and is also fed back to D flip-flop 120 through exclusive NOR gate 118. The output of D flip-flop 114 enters another input of exclusive NOR gate 118. D flip-flop 122 outputs a PCIe second generation clock signal 132b at a quarter of the frequency of the PLL clock signal 102.

The output of D flip-flop 128 enters D flip-flop 130 and is also fed back to D flip-flop 128 through exclusive NOR gate 126. The outputs of D flip-flop 114 and D flip-flop 120 are gated by the OR gate 124 before entering exclusive NOR gate 126. D flip-flop 130 outputs a PCIe first generation clock signal 132a at one-eighth of the frequency of the PLL clock signal 102.

Two of the generated clock signals 132a, 132b, 132c are blocked by the clock-gating cells 212a, 212b, 212c and only one of the clock signals 132a, 132b, 132c is output in accordance with the control signals 244a, 244b, 244c (clk_g1_en, clk_g2_en, clk_g3_en) as a transmit clock signal (TXCLK) 140 to be provided to the links. TXCLK signal is shown in line 17 in FIG. 4. The control signals 244a, 244b, 244c are shown in lines 14-16 in FIG. 4. Each of the clock gating cells 212a, 212b, 212c includes a gated D latch 214a, 214b, 214c and an AND gate 216a, 216b, 216c, respectively. Each of the control signals 244a, 244b, 244c (clk_g1_en, clk_g2_en, clk_g3_en) enters the D input of the gated D latch 214a, 214b, 214c and each of the clock signals 132a, 132b, 132c enters the G input of the gated D latch 214a, 214b, 214c through an inverter, respectively. Each of the clock signals 132a, 132b, 132c enters AND gate 216a, 216b, 216c bypassing gated D latch 214a, 214b, 214c, respectively. The output of AND gates 216a, 216b, 216c enters OR gate 218. When clk_g1_en signal 244a is asserted, the first generation clock signal 132a is output; when clk_g2_en signal 244b is asserted, the second generation clock signal 132b is output; and when clk_g3_en signal 244c is asserted, the third generation clock signal 132c is output, respectively through OR gate 218.

The control signals 244a, 244b, 244c are generated based on request_clk signals 232. Generation of the request_clk signals 232 will be explained in detail with reference to FIG. 2. The request_clk signal 232 is a signal indicating the clock signal to be generated. The request_clk signal 232 may be a two bit signal indicating one of three clock speeds in this example (e.g., "00" indicates a first generation clock signal, "01" indicates a second generation clock signal, and "10" indicates a third generation clock signal).

The generated request_clk signal 232 (the output signal coming from the circuit in FIG. 2) may be gated through a series of four D flip-flops 234, 235, 236, 237 before entering D flip-flops 238. D flip-flops 234, 235, 236, 237 are clocked by the transmit clock signal (TXCLK) 140 delayed by a series of four delay buffers 246, 247, 248, 249. The TXCLK signals delayed by the four delay buffers 246, 247, 248, 249 are shown in lines 21-24 in FIG. 4. Each delay buffer 246, 247, 248, 249 may delay the clocking signal 140 by a certain delay time (e.g., up to 1 nanosecond (ns) per delay buffer at 1 gigahertz (GHz)). This is for ensuring that the TXCLK insertion delay is matched to the core logic, and to step the clock delay back to match the insertion delay at the clock generation logic.

D flip-flops 238 are clocked by the PLL clock signal 102 and three output signals from D flip-flops 114, 120, 128 gated by a NOR gate 240 enter the enable inputs of D flip-flops 238, respectively so that the request_clk signals 232 delayed by the series of D flip-flops 234-237 are transferred (and change the TX clock signal speed) only if all the outputs of D flip-flops 114, 120, 128 are low. The request_clk signal 232 output through D flip-flops 238 drive one of the three AND gates 242a, 242b, 242c high and two of the gates low depending on the request_clk signal 232, and the outputs of AND gates 242a, 242b, 242c become control signals 244a, 244b, 244c to the clock-gating cells 212a, 212b, 212c, respectively.

Referring to FIG. 2, generation of the request_clk signal 232 is explained in detail. A PCIe device may be required to support more than one link, and each link may require a different clock speed. Among the requested clock speeds for a plurality of links (clk_sel_A, clk_sel_B, . . . clk_sel_N), the maximum clock speed is selected by a selector 252. The clk_sel[1:0] signal 254 is a two bit signal in this example indicating the selected maximum clock speed (two bits are necessary for selecting one of the three clock speeds in this example). The selected clock speed signal (clk_sel[1:0]) 254 is output through D flip-flop 256 as the request_clk signal 232. The clk_sel[1:0] signal and the request_clk signal 232 are shown in lines 5 and 6 in FIG. 4.

D flip-flop 256 is clocked by a TXCLK and enabled or disabled based on a count signal 263 (output of D flip-flop 262), comparison of current_clk signal 274 (output of D flip-flop 272) and request_clk signal 232 (output of D flip-flop 256), and a phase signal 286 (output of D flip-flop 284). D flip-flop 272 stores current_clk signal 274 indicating the currently selected clock speed (e.g., "00" indicates a first generation clock signal, "01" indicates a second generation clock signal, and "10" indicates a third generation clock signal). The request_clk signal 232 becomes the current_clk signal 274 when the TXCLK signal switches.

Comparator 264 determines whether the request_clk signal 232 is different from current_clk signal 274 and the output of comparator 264 enters the enable input of D flip-flop 262. D flip-flop 262 is enabled only if the request_clk signal 232 and the current_clk signal 274 are different (i.e., the request_clk signal has been changed). D flip-flop 262 and a +1 adder 266 in the feedback loop back to the D input of D flip-flop 262 operate as a two bit counter counting the number of TXCLK cycles after the request_clk signal 232 and the current_clk signal 274 become different. The count signal 263 is shown in line 12 in FIG. 4.

Comparator 268 outputs high when the count signal 263 becomes "11." The output of comparator 268 enters the enable input of D flip-flop 272. Therefore, the request_clk signal 232 becomes the current_clk signal 274 four TXCLK cycles after the request_clk signal 232 has been changed in this example, as shown in lines 6-10 in FIG. 4. The four TXCLK cycles are because the ratio of the fastest clock signal (1 GHz) and the slowest clock signal (250 MHz) is 4 and different TXCLK cycles may be necessary depending on the clock speeds required by the system. Comparator 276 compares the current_clk signal 274 and the request_clk signal 232, and outputs to AND gate 292.

The current_clk signal 274 drives first and second multiplexers 282, 290. The first multiplexer 282 outputs "00" if current_clk signal 274 is "00," a phase signal+2 if current_clk signal 274 is "01," and a phase signal+1 if current_clk signal 274 is "10." The output of multiplexer 282 enters the D input of D flip-flop 284, whose two bit output is the phase signal 286 (line 11 in FIG. 4). The phase signal 286 is a two bit signal in the example. Comparator 288a outputs high if the phase signal 286 is "00," otherwise it outputs low. Comparator 288b outputs high if the phase signal 286 is "01," otherwise it outputs low. Comparator 288c outputs high if the phase signal 286 is "10," otherwise it outputs low. The second multiplexer 290 outputs one of the outputs of comparators 288a, 288b, 288c depending on the current_clk signal 274. The outputs from comparator 276 and second multiplexer 290 are gated by AND gate 292, whose output enables or disables D flip-flop 256.

The logic of the clock switching controller including generation of the count signal 263 and the phase signal 286 and comparison of the current_clk signal 274 and the request_clk signal 232 ensures that switching of the clock signals (TX-CLK) occur only on a particular phase, glitch-free, and in a known amount of time without interrupting data transfers on any of the other ports.

Referring to FIG. 3, generation of clock enabling signal is explained in detail. The source clock is expected to be running at the highest data rate supported by PCIe IP (e.g., 1 GHz for PCIe 3.0 support). The clock generator 100 creates 1 GHz, 500 MHz, and 250 MHz clock signals and provides one of the generated clock signals to all PCIe links. The clock switching controller 200 determines the fastest clock speed required by the active links in the PCIe IP core, and provides the fastest clock signal to all PCIe links. Since the same clock signal is provided to all PCIe links, the clock switching controller 200 also generates a clock enabling signal for each of the link(s) that requires a slower clock signal. For example, if the fastest clock speed requested by the links is 1 GHz, the clock switching controller 200 will generate, and provide, the 1 GHz clock signal to all links. The clock switching controller 200 also provides a clock enabling signal to each link so that the 1 GHz signal is enabled every other clock cycle for the links that request 500 MHz clock speed, and enabled only every fourth clock cycle for the links that request 250 MHz clock speed by the clock enabling signals. The clock enabling signals are shown in lines 18-20 in FIG. 4. One of the three clock enabling signals is selected for each link.

FIG. 3 shows an example clock enabling signal generation circuit 300 for link A. Multiple sets of the circuit 300 shown in FIG. 3 are included in the clock switching controller 200 for supporting multiple links.

The clock speed requested by link A is clk_sel_A, that is a two bit signal driving the multiplexer 310 to output one of three inputs (enabling signals 309a, 309b, 309c) depending on the requested clock speed (e.g., "00" for a first generation clock signal, "01" for a second generation clock signal, and "10" for a third generation clock signal).

The three enabling signals 309a, 309b, 309c (clk_en[0], clk_en[1], clk_en[2]) are generated based on the current_clk signal 274, the request_clk signal 232, the count signal 263, and the phase signal 286. Either current_clk signal 274 or request_clk signal 232 enters three comparators 322, 332, 342 depending on the count signal 263 (i.e., request_clk signal if the count signal is "11," otherwise current_clk signal). The count signal 263 is compared by comparator 302, whose output controls the multiplexer 304.

If the current_clk signal 274 or the request_clk signal 232 is "00," the first branch 320 generates an always-on signal, a 50% duty cycle signal, or a 25% duty cycle signal depending on the current_clk signal 274. If current_clk signal 274 or the request_clk signal 232 is "00," the output of comparator 322 (and therefore OR gate 324) is always high, so an always-on signal is generated and provided to the multiplexer 310 through D flip-flop 308. Comparators 325a and 325c compare the current_clk signal 274 to "01" and "10," respectively, and comparators 325b and 325d compare the phase signal 286 to "00" and "10," respectively. If current_clk signal 274 is "01," the output of comparator 322 and the output of AND gate 328 are low, but AND gate 326 is turned on while the phase value is "00." Since the phase signal 286 while the current_clk signal 274 is "01" alternates between "00" and "01," the output of AND gate 326 (and consequently OR gate 324) is turned on 50% of the time. If current_clk signal 274 is "10," the output of comparator 322 and AND gate 326 are low, but AND gate 328 is turned on while the phase signal is "00." Since the phase signal 286 while the current_clk signal is "10" alternates between "00," "01," "10," and "11," the output of AND gate 328 (and consequently OR gate 324) is turned on 25% of the time. For example, if the current_clk signal is "10," (which means the TXCLK signal is at 1 GHz), and the clock speed requested for the link A is 250 MHz (i.e., clk_sel_A is "00"), the multiplexer 310 outputs the first branch signal, which is a 25% duty cycle signal that is output from AND gate 328, and the TXCLK at 1 GHz is enabled only for 25% of the time to derive the 250 MHz clock signal for the link A from the common 1 GHz TXCLK. If the current_clk signal is "01" (which means the TXCLK signal is at 500 MHz), and the clock speed requested for link A is 250 MHz (i.e., clk_sel_A is "00"), the multiplexer 310 outputs the first branch signal, which is a 50% duty cycle signal that is output from AND gate 326.

If the current_clk signal 274 or the request_clk signal 232 is "01," the second branch 330 generates either an always-on signal or a 50% duty cycle signal. If the current_clk signal 274 or the request_clk signal 232 is "01," the output of comparator 332 (and consequently OR gate 334) is always high, so an always-on signal is generated and provided to the multiplexer 310 through D flip-flop 308b. Comparator 335a compares current_clk signal to "10" and comparator 335b compares the first bit of the phase signal to "0." If the current_clk signal 274 is "10," the output of comparator 332 is low, but AND gate 336 is turned on while the first bit of the phase signal 286 is "0," which generates a 50% duty cycle signal.

If the current_clk signal 274 or the request_clk signal 232 is "10," the third branch 340 (i.e., comparator 342) generates an always-on signal that is gated through D flip-flop 308a to the multiplexer 310.

Figure 5:
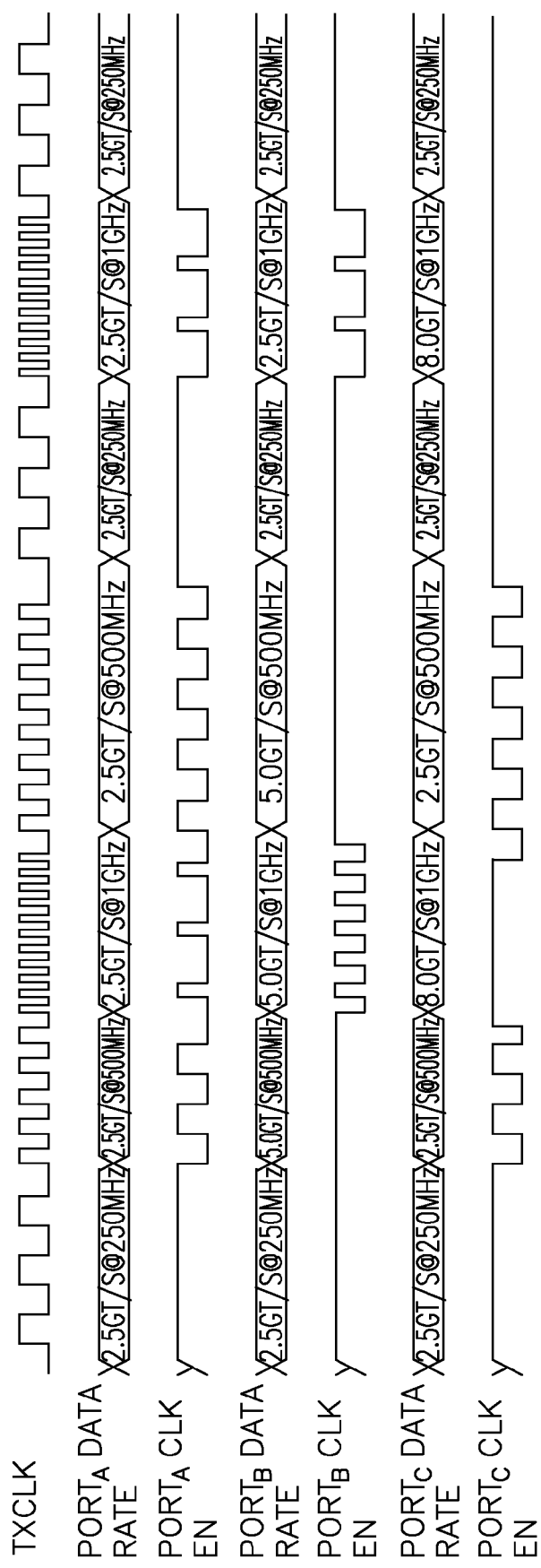
FIG. 5 shows an example timing diagram of the enabling signals for ports A-C.

FIG. 5 shows an example timing diagram of the enabling signals for ports A-C. Initially, the data rates requested for ports A-C are all 250 MHz (i.e., 2.5 gigatransfers per second (GT/s)). Therefore, TXCLK is generated at 250 MHz and the enabling signals for ports A-C are all always-on signals. The data rate requested for link B increases to 500 MHz (i.e., the transfer rate is increased to 5 GT/s). The TXCLK is switched to the 500 MHz signal and is provided to all links A-C. Since the data rate for links A and C remains 250 MHz, the 50% duty cycle clock enabling signals are provided for links A and C. Then, the data rate requested for link C increases to 1 GHz. The TXCLK is switched to the 1 GHz signal and is provided to all links A-C. Since the data rates for links A and B are 250 MHz and 500 MHz, respectively, the clock enabling signals for links A and B become 25% and 50% duty cycle signals, respectively. Then, the data rate requested for link C decreases to 250 MHz. The TXCLK is switched back to the 500 MHz signal and is provided to all links A-C. The clock enabling signal for links A-C become a 50% duty cycle signal, an always-on signal, and a 50% duty cycle signal, respectively. Then, the data rate requested for port B decreases to 250 MHz and TXCLK is switched to 250 MHz. Then, the data rate for port C increases to 1 GHz and TXCLK is switched to 1 GHz. The clock enabling signals for ports A and B becomes a 25% duty cycle signal since the data rate for ports A and B is 250 MHz. Then, the data rate for port C decreases to 250 MHz and TXCLK is switched to 250 MHz, and the clock enabling signals for ports A-C become always-on signals.

The clock switching in accordance with the embodiments disclosed above has an advantage of area and power savings such that only one PLL may be used per PCIe IP core instead of one PLL per PCIe link in the PCIe IP core. One PCIe IP core may be used to run links running at multiple speeds, instead of having to instantiate one PCIe IP per link. Due to the fact that the clock switching circuit changes clock speeds glitch-free, the embodiments allow the links that are not changing speeds to operate uninterrupted. In addition, in accordance with the embodiments, the clock switching is guaranteed to provide the updated clock rate within four clock cycles.

Currently, the vast majority of electronic circuits are designed and manufactured by using software (e.g., hardware description language (HDL)). HDL is a computer language for describing structure, operation, and/or behavior of electronic circuits. The clock generator 100 (i.e., the electronic circuit) may be designed and manufactured by using software (e.g., HDL). HDL may be any one of the conventional HDLs that are currently being used or will be developed in the future. A set of instructions are generated with the HDL to describe the structure, operation, and/or behavior of the clock generator 100. The set of instructions may be stored in any kind of computer-readable storage medium.

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

What is claimed is:

1. A device configured to switch a clock speed for multiple links running at different clock speeds, the device comprising:
    a frequency divider configured to generate from a source clock signal a plurality of clock signals at different frequencies;
    a clock switching controller configured to select one of the clock signals for a plurality of ports and output the selected clock signal to each port at a data rate requested by each port; and
    wherein the clock switching controller is configured to select one of the clock signals that matches a maximum data rate among data rates requested by the plurality of ports.

2. The device of claim 1 wherein the selected clock signal is downconverted to match a data rate requested by each port.

3. The device of claim 1, wherein the clock switching controller comprises:
    a counter for counting a clock cycle of the selected clock signal, wherein the clock switching controller is configured to reselect one of the generated clock signals a predetermined number of clock cycles after the maximum data rate has been changed.

4. The device of claim 1, wherein the clock switching controller comprises:
    a storage for storing information of a phase of the selected clock signal, such that the selected clock signal is switched at a predetermined phase of the selected clock signal on a condition that the maximum data rate changes.

5. The device of claim 1, wherein the device is a Peripheral Component Interconnect Express (PCIe)-compatible device.

6. The device of claim 1, wherein the device is a Hyper-Transport-compatible device.

7. The device of claim 1, wherein the frequency divider is configured to generate at least two of 250 MHz, 500 MHz, and 1 GHz signals.

8. The device of claim 1, wherein the source clock signal is a phase locked loop clock signal.

9. A method for switching a clock speed for multiple links running at different clock speeds, the method comprising:
    generating via a frequency divider, from a source clock signal a plurality of clock signals at different frequencies;
    selecting with a switch one of the clock signals for a plurality of ports;
    outputting the selected clock signal to each port at a data rate requested by each port; and
    wherein one of the clock signals is selected that matches a maximum data rate among data rates requested by the plurality of ports.

10. The method of claim 9 wherein the selected clock signal is downconverted to match a data rate requested by each port.

11. The method of claim 9, wherein one of the generated clock signals is reselected a predetermined number of clock cycles after the maximum data rate has been changed.

12. The method of claim 9, wherein the selected clock signal is switched at a predetermined phase of the selected clock signal on a condition that the maximum data rate changes.

13. The method of claim 9, wherein the link is a Peripheral Component Interconnect Express (PCIe)-compatible link.

14. The method of claim 9, wherein the link is a HyperTransport-compatible link.

15. The method of claim 9, wherein the generated clock signals are at least two of 250 MHz, 500 MHz, and 1 GHz signals.

16. The method of claim 9, wherein the source clock signal is a phase locked loop clock signal.

17. A non-transitory computer-readable storage medium storing a set of instructions for execution by a computer to switch a clock signal for multiple links running at different clock speeds, the set of instructions comprising:
   a code segment for generating from a source clock signal a plurality of clock signals at different frequencies;
   a code segment for selecting one of the clock signals for a plurality of ports;
   a code segment for outputting the selected clock signal to each port at a data rate requested by each port; and
   wherein one of the clock signals is selected that matches a maximum data rate among data rates requested by the plurality of ports.

18. The non-transitory computer-readable storage medium of claim 17, wherein the instructions are hardware description language (HDL) instructions used for the manufacture of a device.

* * * * *